No. 623,550. Patented Apr. 25, 1899.
Z. KEOUGH.
FRICTION CLUTCH.
(Application filed July 26, 1898.)
(No Model.) 2 Sheets—Sheet 1.
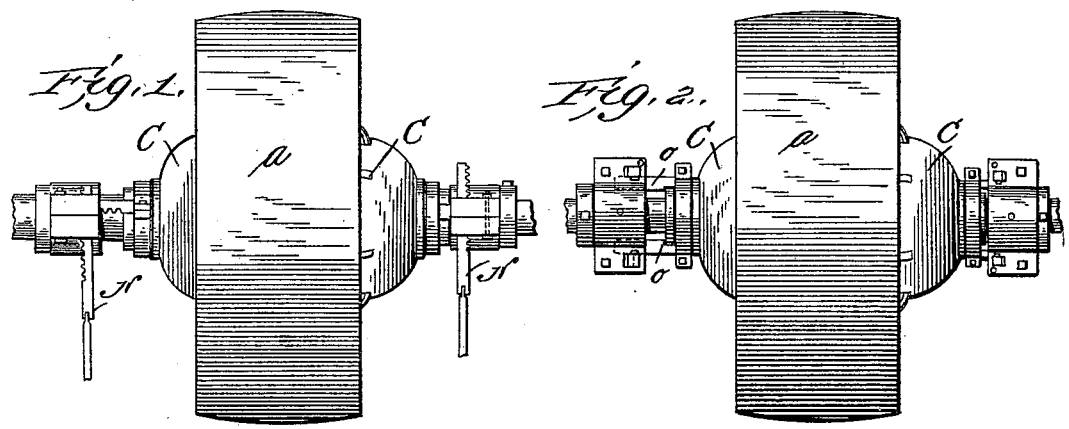
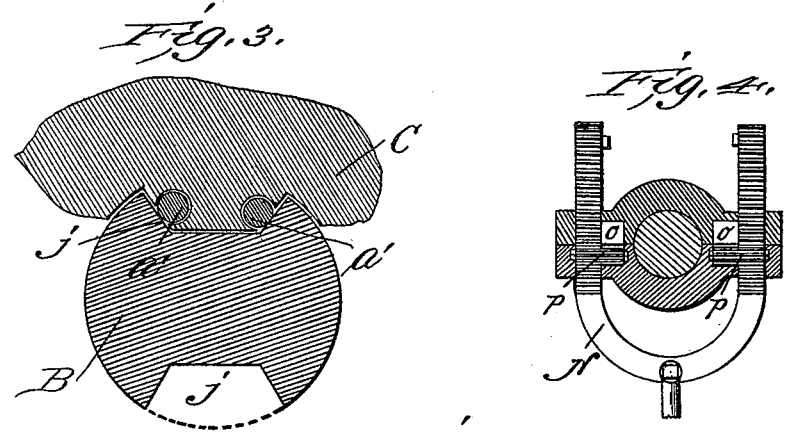
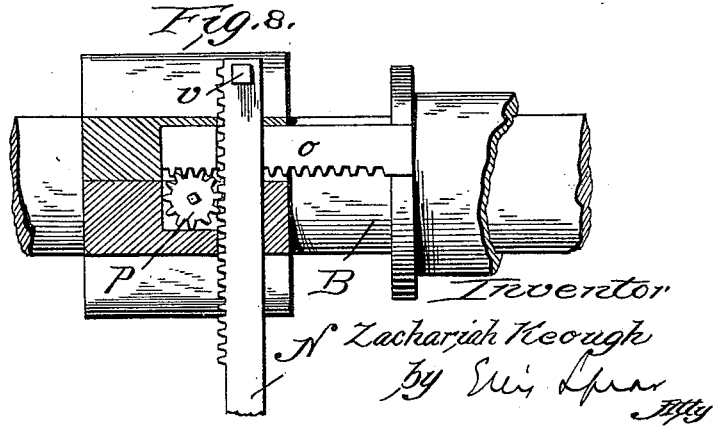
Attest:
F. L. Middleton
C. Sundahlin
Inventor:
Zachariah Keough
By Ellis Spear
Atty
THE NORRIS PETERS CO., PHOTO-LITHO., WASHINGTON, D. C.

No. 623,550. Patented Apr. 25, 1899.
Z. KEOUGH.
FRICTION CLUTCH.
(Application filed July 26, 1898.)
(No Model.) 2 Sheets—Sheet 2.
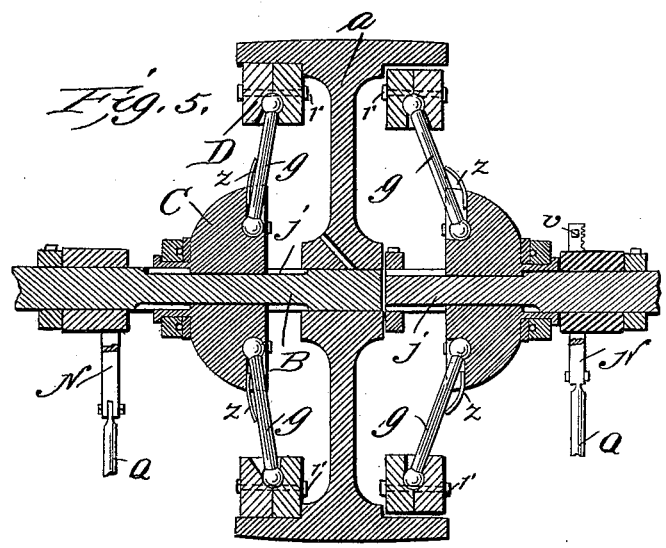
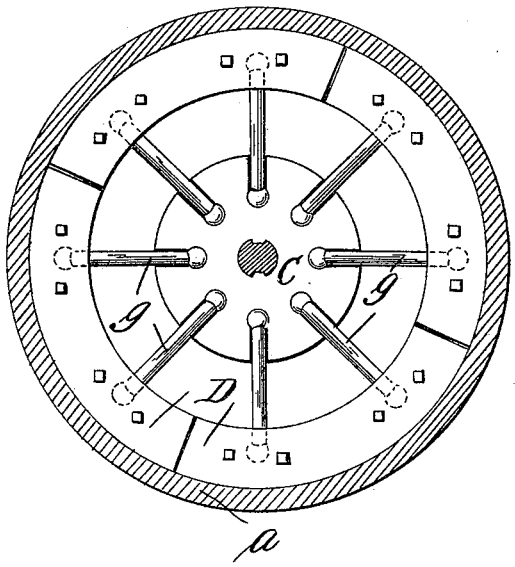
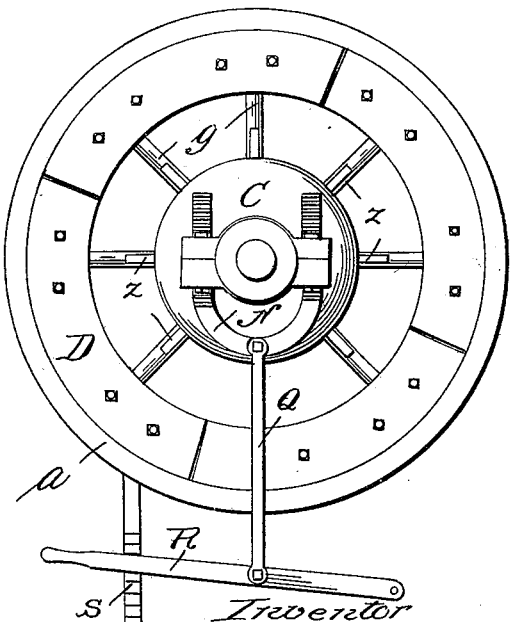
Attest
F. L. Middleton
C. S. Middleton
Inventor
Zachariah Keough
by Eli Spear Atty.

UNITED STATES PATENT OFFICE.

ZACHARIAH KEOUGH, OF SHELBY, OHIO.

FRICTION-CLUTCH.

SPECIFICATION forming part of Letters Patent No. 623,550, dated April 25, 1899.

Application filed July 26, 1898. Serial No. 686,945. (No model.)

*To all whom it may concern:*

Be it known that I, ZACHARIAH KEOUGH, a citizen of the United States, residing at Shelby, Richland county, Ohio, have invented certain new and useful Improvements in Friction-Clutches, of which the following is a specification.

My invention relates to frictional clutches, and it is intended to provide an effective and strong clutch of simple construction.

The invention includes a clutch-rim adapted to be applied to the pulley, a slidable hub, and connecting-arms having their ends seated and retained directly in the solid or body portions of said rim and hub.

It further includes a boxing carrying a pinion and guiding a rack which is shifted by said pinion to operate the clutch, and a second rack for operating said pinion, also guided in said boxing, with means for reciprocating the latter rack transversely of the shaft.

In the accompanying drawings, Figure 1 is a side elevation showing a pulley and a part of a shaft with the double clutch applied. Fig. 2 is a plan view of Fig. 1. Fig. 3 is a detail showing a section through the shaft and illustrating the roller-bearings interposed between the shaft and the hub. Fig. 4 is a detail showing a section through the shaft and illustrating the yoke and gear connection for operating the hub. Fig. 5 is a sectional view taken longitudinally. Fig. 6 is a view looking at the inner face of the hub and showing the arms connecting the hub with the rim of the pulley-block. Fig. 7 is a like view showing the other faces of the hub and showing also means for holding the clutch in and out of gear. Fig. 8 is a detail view of the clutch-actuating mechanism.

In the accompanying drawings the shaft is shown at B and the pulley at $a$, the pulley, as usual, being loose on the shaft, and the clutching device, which is the subject of this invention, is adapted, as usual, to engage the pulley and make it fast with the shaft, so that it will rotate therewith. The friction-clutch comprises a hub C, having a flat inner face which is moved longitudinally upon the shaft, and a rim D, which engages the under face of the pulley, this rim being connected to the hub by a series of pivoted arms which, with the hub, act as toggle-levers to force the rim D against the under face of the pulley. The clutch is used double—one upon each side of the pulley—and their construction and operation are substantially the same. By the use of a double clutch I am enabled to use two shafts, as shown in Fig. 5, the ends of the shafts abutting, one clutch being carried by one shaft and the other by the second shaft, so that the pulley may be used with one shaft or the other to rotate in one direction or the other, according to the clutch used. The shaft B is provided with grooves $j$ for a portion of its length, as shown in Figs. 3 and 5, and the hub C is, as shown in these figures, fitted to engage these grooves, and in order to make the movement easy and without friction I insert a series of balls $a'$ into grooves or channels formed in the faces of the hub which are opposite the walls of the grooves in the shaft B.

The arms $g$, which connect the rim and hub, have enlarged spherical ends. The rim D is made up of a series of independent sections, each of which is supported by two of the arms $g$, and each section is made up of two parts bolted together, having hemispherical recesses in their opposing faces, which form a socket or seat on the outer ends of the arms $g$. The hub has radial recesses therein opening in from the flat face of the same, the inner portions of which are slightly enlarged and rounded to provide sockets or seats to receive the inner spherical ends of said arms $g$. The recesses in the face of the hub permit the ready insertion of the arms therein, and to retain the ends in place plates X are bolted across the inner portion of said recesses, which, in connection with the inner walls of the recesses, form complete sockets to receive and hold said ends. In applying the clutch the outer ends of the arms bear directly against the rim and the inner ends of said arms bear directly against the solid or body portion of said hubs. Thus there are no immediate connections between said arms and the rim and hub which are subject to strain in applying the rim to the pulley and no parts that may bind or break without the hub or the rim themselves break.

The hub C is moved longitudinally upon the shaft by means of a yoke N, terminating in a rod Q, extending to a foot-lever R or a handlever, if desired, and this lever may engage a rack S, so as to hold the clutch in or out of engagement.

In the rear of each hub a boxing L surrounds the shaft B, which is formed of an upper and a lower section, each provided with corresponding lateral flanges. The upper lateral flange on each side of the shaft B has a recess in its under face in which are guide rack-bars o, having their ends connected to the contiguous hub C. The flanges of the lower sections are recessed to accommodate pinions p, which mesh with the teeth of the rack-bar o. The prongs of the yoke N are toothed to provide rack-bars, one of which passes on each side of the shaft B, being guided in openings through the flanges of said boxing to one side of the rack-bar o and in mesh with the ends of the pinion P, so that as the yoke is reciprocated transversely of the shaft it will rotate the pinions, which will reciprocate the rack-bars o, parallel with the shaft, and operate the clutch. The racks o connect at their ends with a collar H, embracing an extension of the hub C, and a ball-bearing is provided between the face of the collar and a ring $h'$.

I claim—

1. The combination with a pulley, a shaft, a rim, of a series of radial arms having spherical inner ends and a solid hub having sockets therein to receive said ends, recesses leading out radially from said sockets to the outer periphery of the hub of less width than the diameter of said ends, the walls thereof confining a part of the intermediate portion of said arms, said recesses and sockets opening out laterally of said hub whereby the arms may be readily inserted in position, substantially as described.

2. In combination, the shaft, the pulley, the rim and hub having the arms connecting the same and the means for shifting said hub comprising a rack-bar arranged parallel with the shaft on each side thereof having a connection to said hub, a fixed collar surrounding the shaft a distance from the pulley forming a guide for the outer end of said racks, a pinion confined by said collar located on each side of the shaft in mesh with said racks and a yoke vertically movable with its bail portion centrally beneath said collars and its ends guided in said collar and toothed, one end thereof meshing with each of said pinions and means pivoted centrally of said bail having a vertical reciprocatory and swinging movement adapted to reciprocate the bail in a direct vertical line, substantially as described.

In testimony whereof I affix my signature in presence of two witnesses.

ZACHARIAH KEOUGH.

Witnesses:
A. S. STUMF,
JOHN W. COLE.